US012808419B2

(12) United States Patent
Rueger et al.

(10) Patent No.: US 12,808,419 B2

(45) Date of Patent: Nov. 24, 2026

(54) LATTICE DESIGN FOR ENERGY ABSORPTION AND VIBRATION DAMPING APPLICATIONS

(71) Applicant: Honeywell Federal Manufacturing & Technologies, LLC, Kansas City, MO (US)

(72) Inventors: Zachariah Rueger, Overland Park, KS (US); Amer Sadikovic, Ballwin, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 599 days.

(21) Appl. No.: 18/366,030

(22) Filed: Aug. 7, 2023

(65) Prior Publication Data

US 2024/0003396 A1 Jan. 4, 2024

Related U.S. Application Data

(63) Continuation of application No. 17/374,402, filed on Jul. 13, 2021, now Pat. No. 11,761,503.

(51) Int. Cl.

*F16F 3/02* (2006.01)
*F16F 7/12* (2006.01)
*F16F 15/073* (2006.01)

(52) U.S. Cl.

CPC .............. *F16F 3/023* (2013.01); *F16F 7/121* (2013.01); *F16F 7/123* (2013.01); *F16F 15/073* (2013.01); *F16F 2224/0208* (2013.01); *F16F 2230/34* (2013.01); *F16F 2238/022* (2013.01)

(58) Field of Classification Search

CPC .......... F16F 7/121; F16F 7/123; F16F 15/073; F16F 3/023; F16F 2230/34; F16F 2238/022

See application file for complete search history.

(56) References Cited

U.S. PATENT DOCUMENTS 3,412,628 A * 11/1968 De Gain ................ F16F 7/123 52/843
3,564,688 A * 2/1971 De Gain ................ F16F 7/123 74/492
3,972,390 A * 8/1976 Melton .................. F16F 7/123 293/133
4,312,430 A * 1/1982 Ohtani .................. F16F 7/123 74/492
11,174,911 B2 * 11/2021 Kang ...................... F16F 3/00
11,761,503 B2 * 9/2023 Rueger .................... F16F 7/00 267/140.5

(Continued)

FOREIGN PATENT DOCUMENTS

CN 104565154 A * 4/2015 ........... F16F 3/0876
CN 108583483 A * 9/2018 .......... B60R 19/023

(Continued)

*Primary Examiner* — Thomas J Williams

(74) *Attorney, Agent, or Firm* — Erise IP, P.A.

(57) ABSTRACT

A lattice structure and system for absorbing energy, damping vibration, and reducing shock. The lattice structure comprises a plurality of unit cells, each unit cell comprising a plurality of rib elements with at least a portion of the rib elements including a solid bendable hinge portion for converting energy into linear motion along a longitudinal axis of the respective rib element.

19 Claims, 5 Drawing Sheets

(56) References Cited

U.S. PATENT DOCUMENTS

| | | | | |
|---|---|---|---|---|
| 12,663,054 | B1 * | 6/2026 | Nazir | F16F 7/121 |
| 2004/0060791 | A1 * | 4/2004 | Akiyama | F16F 1/37 188/377 |
| 2007/0206252 | A1 * | 9/2007 | Sissom | F16C 11/12 |
| 2016/0027425 | A1 * | 1/2016 | Cook | F28D 7/0058 428/221 |
| 2016/0325520 | A1 * | 11/2016 | Berger | F16S 3/08 |
| 2018/0237965 | A1 * | 8/2018 | Li | F16C 11/12 |
| 2021/0316501 | A1 * | 10/2021 | Boyce | B22F 10/37 |
| 2023/0052509 | A1 * | 2/2023 | Wang | B33Y 80/00 |
| 2024/0003396 | A1 * | 1/2024 | Rueger | F16F 15/073 |

FOREIGN PATENT DOCUMENTS

| | | | | |
|---|---|---|---|---|
| DE | 202004011602 | U1 * | 12/2005 | B60R 19/34 |
| FR | 2916029 | A1 * | 11/2008 | F16F 3/023 |
| GB | 2022764 | A * | 12/1979 | F16F 7/123 |

* cited by examiner

LATTICE DESIGN FOR ENERGY ABSORPTION AND VIBRATION DAMPING APPLICATIONS

STATEMENT OF GOVERNMENTAL SUPPORT

This invention was made with government support under DE-NA0002839 awarded by the United States Department of Energy/National Nuclear Security Administration. The government has certain rights in the invention.

RELATED APPLICATION

The present application is a continuation application claiming priority benefit, with regard to all common subject matter, of similarly titled U.S. Patent Application Publication No. 2023/0015489, filed Jul. 13, 2021. The above-referenced patent application is hereby incorporated by reference in its entirety into the present application.

BACKGROUND

1. Field

Embodiments of the invention relate to lattice structures. More specifically, embodiments of the invention relate to lattice structures having anisotropic properties.

2. Related Art

Typical lattice structures display isotropic properties such that the properties do not change with respect to direction. Further, typical lattice structures do not comprise rib elements configured to bend and fold along a longitudinal axis thereof. Accordingly, said lattice structures may not be suited to absorb energy along certain directions, protect from shock, and/or absorb vibration over a broad range of frequencies.

SUMMARY

Embodiments of the invention solve the above-mentioned problems by providing a lattice structure including a unit cell which is configured to absorb energy in at least one direction using one or more solid hinge portions disposed within at least a portion of rib elements within a unit cell of the lattice structure. In some embodiments, each hinge portion forms a Sarrus linkage for converting energy into linear motion along a longitudinal axis of the respective rib element.

A first embodiment of the invention is directed to a unit cell for absorbing energy within a lattice structure, the unit cell comprising a plurality of rib elements, each rib element of the plurality of rib elements comprising one or more bendable solid hinge portions, wherein each of the one or more bendable solid hinge portions are configured to absorb energy by converting the energy into linear motion along a longitudinal axis of the respective rib element, and wherein the unit cell is compliant in axial compression and tension but resistant in torsion.

A second embodiment of the invention is directed to a lattice structure for absorbing energy, the lattice structure comprising a plurality of unit cells, each unit cell of the plurality of unit cells comprising a plurality of rib elements, each rib element of the plurality of rib elements comprising at least one Sarrus linkage having one or more bendable solid hinge portions, wherein the at least one Sarrus linkage is configured to absorb energy by converting the energy into linear motion along a longitudinal axis of the respective rib element, and wherein the lattice structure is compliant in axial compression and tension but resistant in torsion.

A third embodiment of the invention is directed to a system for absorbing energy, the system comprising a lattice structure comprising a plurality of identical unit cells, each identical unit cell comprising a plurality of rib elements, wherein each rib element of a first portion of the plurality of rib elements comprises one or more bendable solid hinge portions configured to absorb energy within the lattice structure by converting the energy into linear motion along a longitudinal axis of the respective rib element, and wherein the lattice structure is anisotropic.

Additional embodiments of the invention are directed to energy absorption techniques for protecting a sensitive component from shock, wherein a lattice structure comprising Sarrus linkages is disposed around or beneath the sensitive component.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 4C:
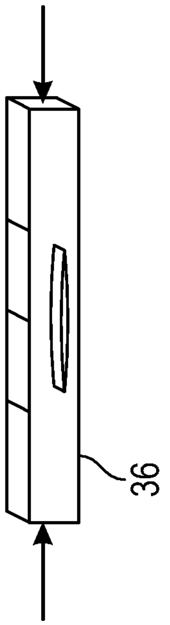
Figure 4B:
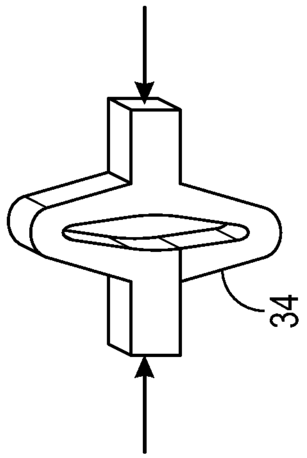
Figure 4A:
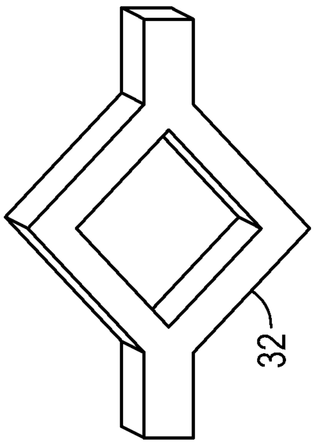
Figure 5:
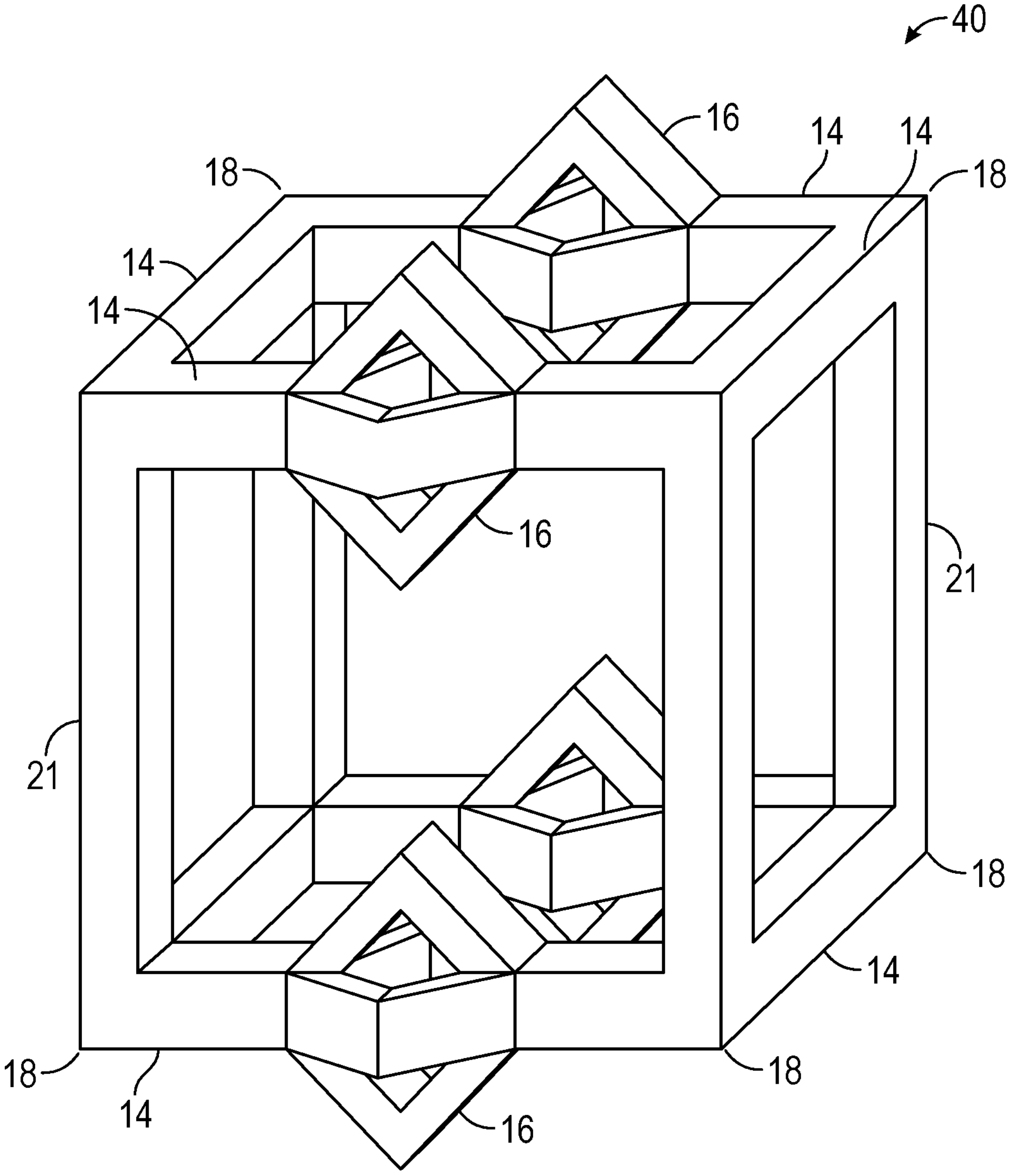

FIG. 4A-C depict exemplary diagrams illustrating various positions of a rib element relating to some embodiments of the invention; and FIG. 5 depicts a cubic unit cell relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
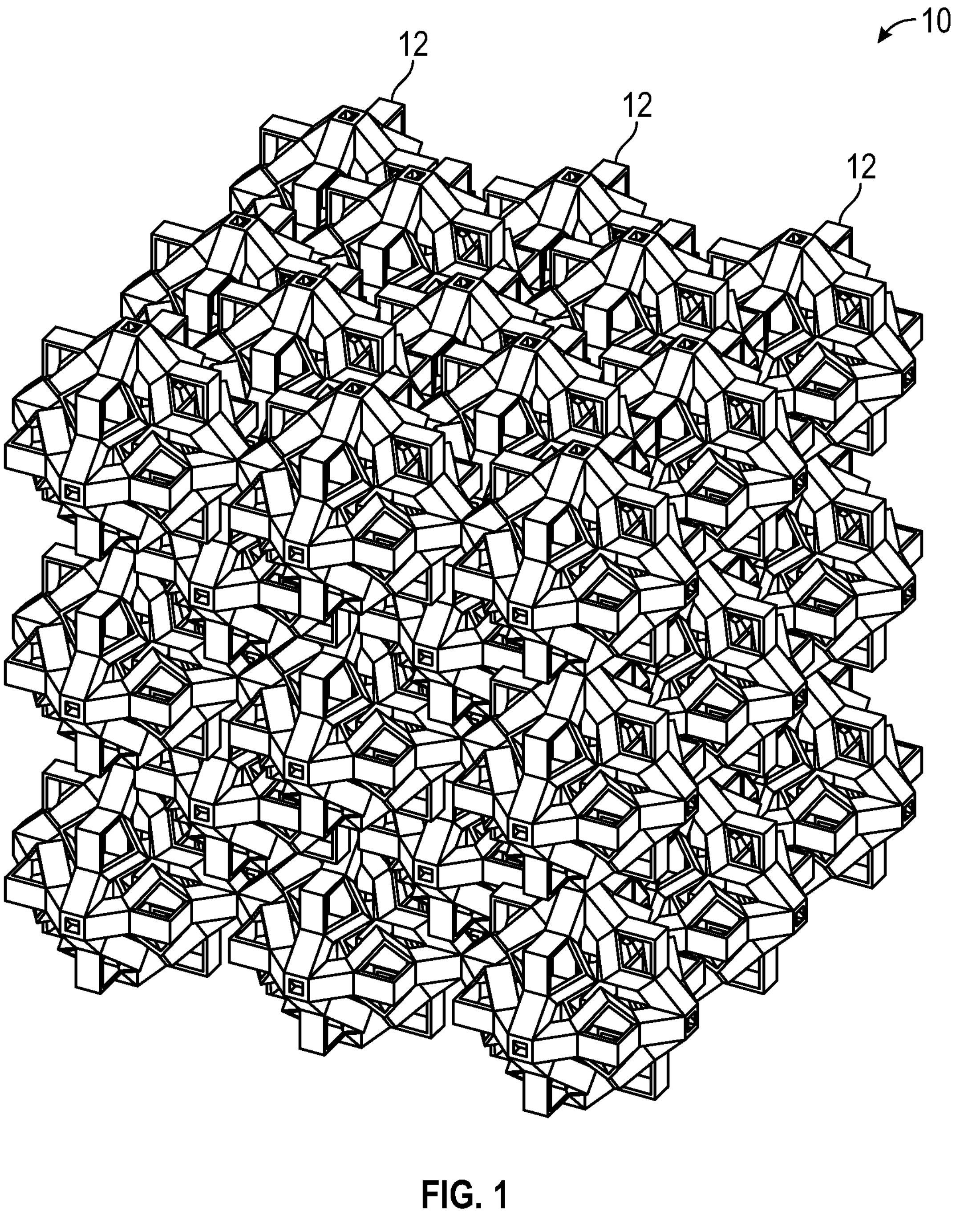
FIG. 1 depicts a lattice structure relating to some embodiments of the invention.

Turning first to FIG. 1, a lattice structure 10 is depicted relating to some embodiments. The lattice structure 10 comprises a plurality of unit cells 12. In some embodiments, the plurality of cells may all be identical unit cells. For example, in some embodiments, the unit cell 12 may be repeated throughout the lattice structure 10, with each of the unit cells 12 connected at a plurality of nodes 18 between the unit cells 12. In some embodiments, some of the unit cells 12 within the lattice structure 10 may be identical and other unit cells 12 may be distinct. In some embodiments, some of the plurality of unit cells 12 may be of a different size. In some embodiments, the plurality of unit cells 12 forming a lattice structure 10 comprises about 10, 20, 50 or 100 unit cells. In some embodiments, the plurality of unit cells 12 may comprise any desired number of unit cells depending on the desired application.

In some embodiments, the lattice structure 10 may be created using an additive manufacturing technique, such as selective laser sintering. However, many other 3D printing techniques are also contemplated such as, for example, stereolithography, fused deposition modeling, digital light processing, material jetting, multi-jet fusion, polyjet fusion, direct metal laser sintering, and electron beam melting, as well as other 3D printing techniques not described herein. Accordingly, the lattice structure 10 may be manufactured as one continuous part consisting of the at least one unit cell 12. In some embodiments, the lattice structure 10 may be one continuous structure of a plurality of identical unit cells 12. In some embodiments, other manufacturing techniques may be used such as, for example, subtractive techniques, casting, machining, and/or molding. In some embodiments, each unit cell 12, or a particular number of unit cells 12, may be manufactured separately and joined via welding or via some other attachment technique at one or more nodes 18 of each unit cell 12, as seen in FIG. 2.

Additionally, in some embodiments, the lattice structure 10 may be composed of a variety of different materials. For example, in some embodiments, it may be desirable to compose at least a portion of the lattice structure 10 of a titanium alloy, such as a Ti64 alloy or a Ti5553 alloy. However, it should be understood that other materials may be used, such as other titanium alloys, other metal alloys, elemental metals, polymers, plastics, ceramics, organic materials, composites, or any combination thereof. In some embodiments, the type of material used may be selected based in part on the manufacturing technique used to create the lattice structure. For example, if the lattice structure 10 is to be 3D printed with selective laser sintering, then a titanium alloy may be selected as it is easily printable. In some embodiments, a combination of materials may be used, with different sections of lattice structure 10 being composed of different materials. In some embodiments, some of the plurality of unit cells 12 may be composed a different material.

Figure 2:
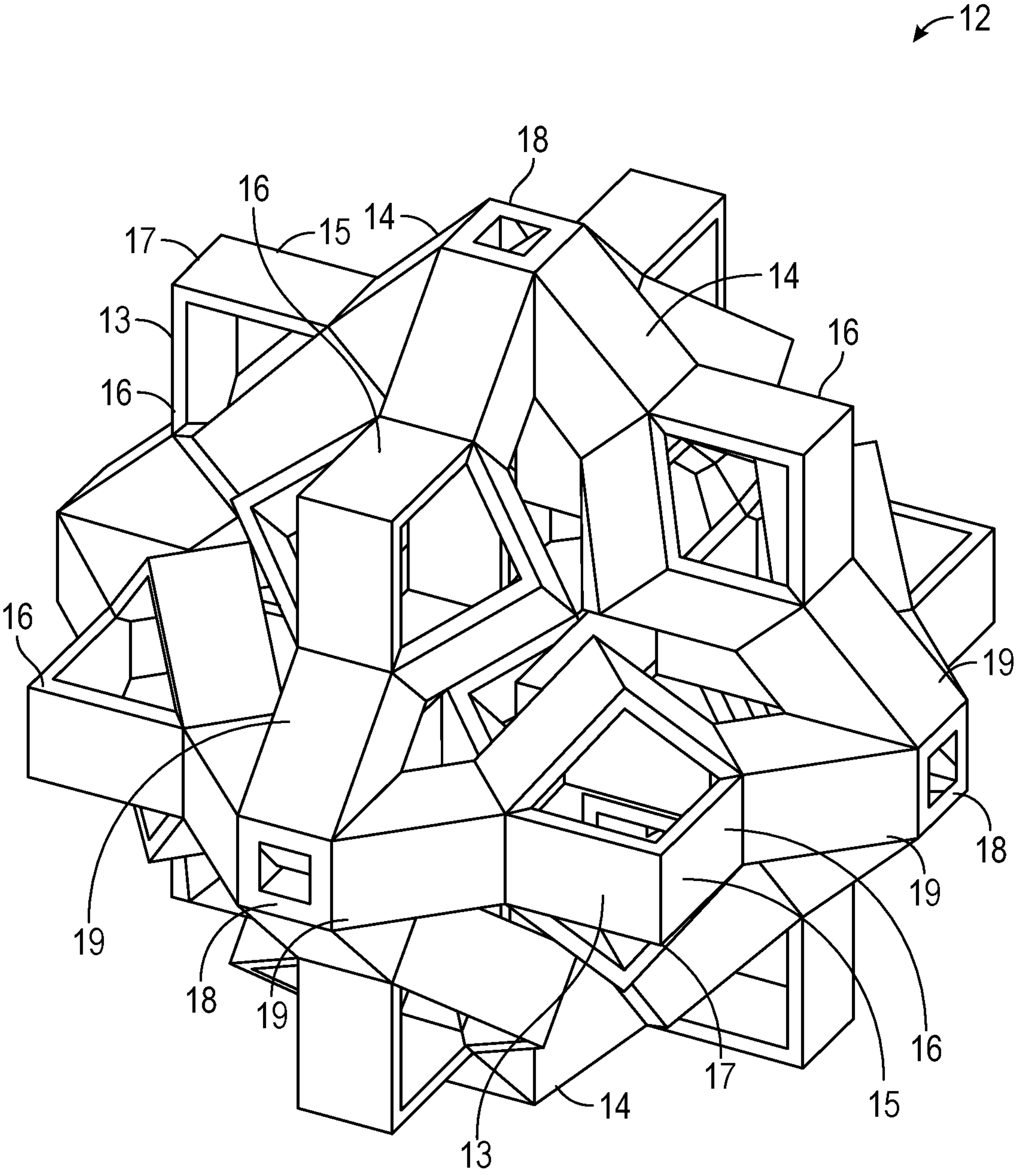
FIG. 2 depicts a unit cell relating to some embodiments of the invention.
Figure 3A:
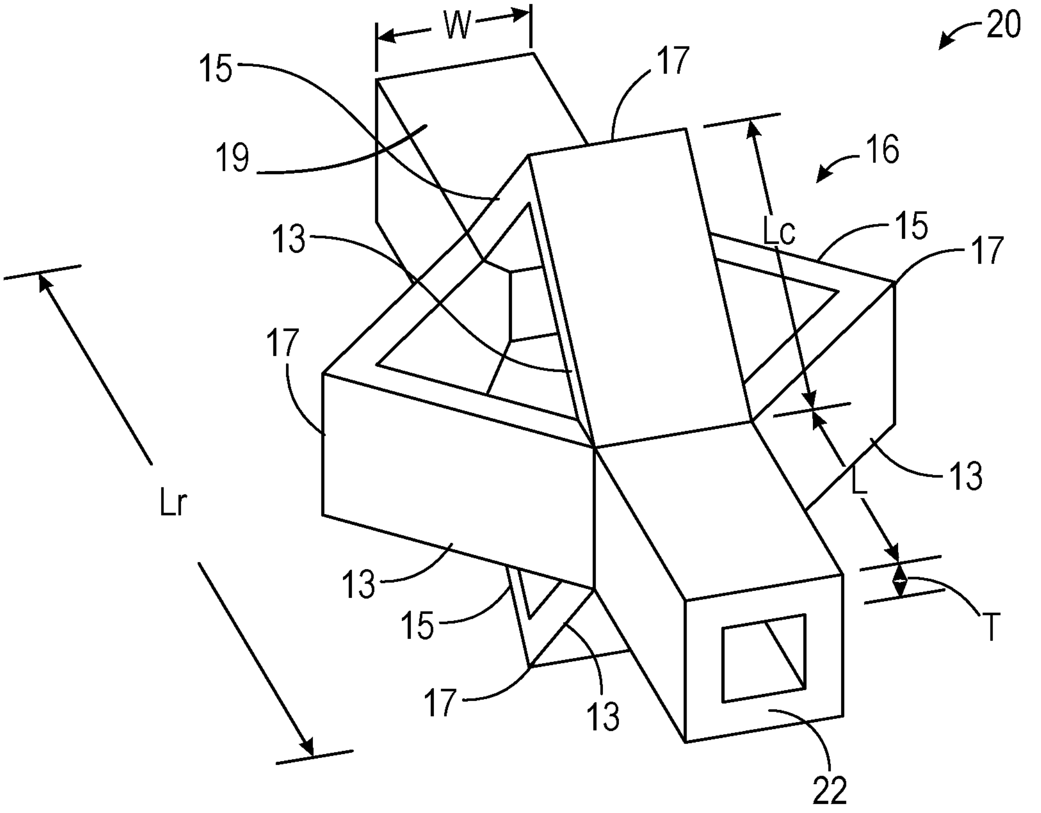
FIG. 3A depicts a first embodiment of a rib element having hollow portions.
Figure 3B:
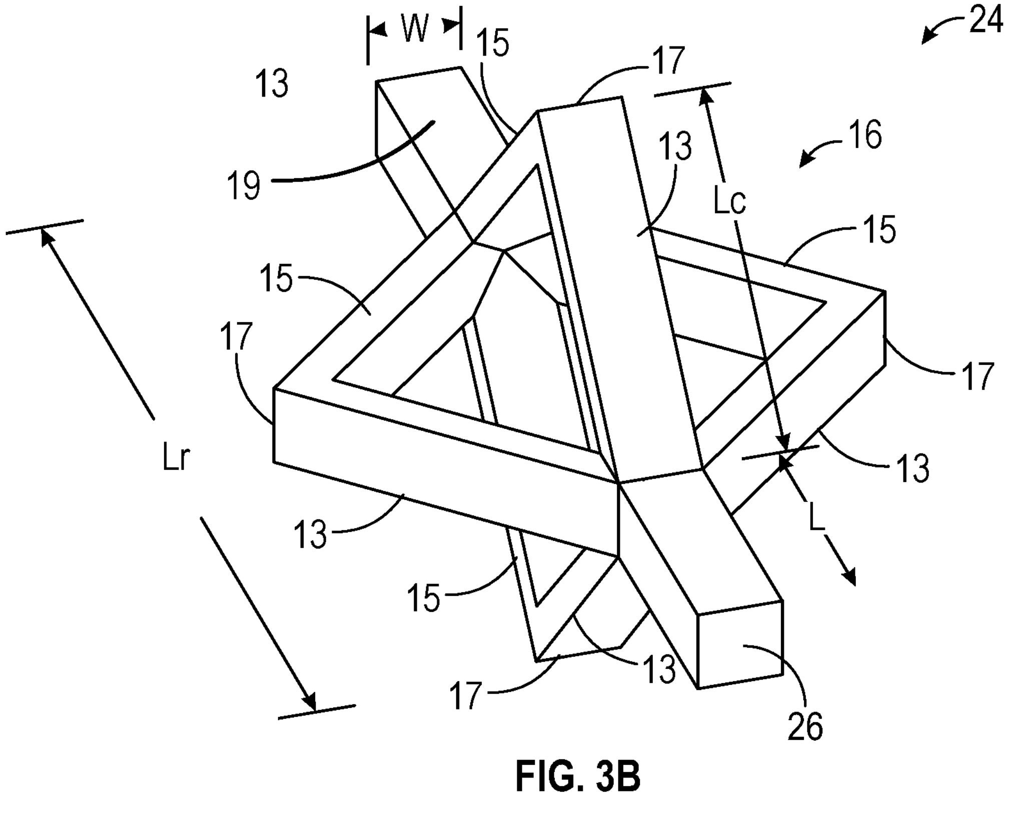
FIG. 3B depicts a second embodiment of a rib element having solid portions.

Turning now to FIG. 2, a unit cell 12 is depicted relating to some embodiments. In some embodiments, the unit cell 12 is included within the lattice structure 10, as shown in FIG. 1. In some embodiments, the unit cell 12 comprises a plurality of rib elements 14, such as shown in FIGS. 3A and 3B. In some embodiments, at least a portion of the rib elements 14 comprise one or more bendable solid hinge portions 16. Hinge portions 16 may comprise a first side 13, a second side 15, and a vertex 17. Rib elements 14 also comprise struts 19 extending from the hinge portions 16. In some embodiments, each unit cell 12 may comprise a first portion of rib elements 14 with hinge portions 16 and a second portion of non-bendable rib elements 21 comprising standard rib elements with no hinge portions, with respect to FIG. 5 (see below). However, embodiments are contemplated where each of the plurality of rib elements 14 comprises one or more bendable solid hinge portions 16. The hinge portions 16 may comprise a bendable solid hinge configured to bend and stretch from a first neutral position under compression and tension respectively. The unit cell 12 further comprises one or more nodes 18 at the end of the struts 19 for connection to other unit cells 12 within the lattice structure 10. For example, in some embodiments, the unit cell 12 may include six nodes 18 for connection to other unit cells placed around the unit cell within the lattice structure 10 (three nodes 18 can be seen in FIG. 2).

In some such embodiments, the hinge portions 16 may have a neutral resting angle of about 90 degrees. Accordingly, the hinge portions 16 may return to the neutral resting position when no load is applied to the lattice structure 10. Alternatively, in some embodiments, the resting angle of the hinge portions 16 may be biased such that the resting angle is greater or less than 90 degrees. For example, embodiments are contemplated where the hinge portions 16 are biased at a resting angle of about 180 degrees, such that extension of the rib element 14 is reduced. Accordingly, embodiments are contemplated where the angle of the hinge portions 16 is biased such that the rib elements 14 may be compliant in compression but resistant in tension because the resting angle is biased to be closer to the maximum angle. Further, embodiments are contemplated where the resting angle of the hinge portions 16 is configured such that the rib elements 14 are compliant in tension but not compression.

In some embodiments, each rib element 14 comprises four deflectable hinge portions 16, as shown in FIGS. 3A and 3B, which are deflectable inwards and outwards from center of the rib element 14. However, embodiments are contemplated where any number of hinge portions are included. In some embodiments, the hinge portions 16 are configured to bend due to an increased aspect ratio of the hinge portions 16. For example, the ratio of length to thickness of the hinge portions 16 may be increased relative to the remaining portions of the rib elements 14, such that the hinge portions 16 are easily bendable or bendable with relatively low resistance. Further, in some embodiments, the aspect ratio of the hinge portions 16 may be limited by the printer resolution or the precision of the specific manufacturing technique used to produce the hinge portions 16. In some embodiments, the hinge portions 16 may be disposed at the center of the length of a rib element 14, as shown. However, embodiments are contemplated where the hinge portions 16 may be disposed elsewhere on the rib elements 14. For example, in some embodiments, the hinge portions 16 may be disposed at either end of the rib elements 14, at an off-center location, or at a joint between two or more rib elements 14.

In some embodiments, the hinge portions 16 form a Sarrus linkage of the rib element 14. The Sarrus linkage may absorb energy by converting energy into linear motion along a longitudinal axis of the respective rib element 14. In some embodiments, the linear motion is associated with bending of the hinge portions 16. Accordingly, when the Sarrus linkage is included in one or more of the rib elements 14, an anisotropic unit cell may be formed such that the properties of the unit cell 12 may be altered in different directions. For example, embodiments are contemplated where the unit cells 12 are compliant in tension and compression, but resistant in torsion. Further, some embodiments are contemplated where the unit cells 12 are resistant in bending. In some embodiments, the lattice structure 10 similarly reflects the anisotropic properties of the unit cells 12 comprised within the lattice structure 10.

In some embodiments, the Sarrus linkage within the lattice structure may be used in a variety of energy absorption applications. For example, the Sarrus linkage may be used in the lattice structure 10 for damping vibrations and isolating components from shock. Additionally, the anisotropic properties of the lattice structure 10 achieved by incorporating the Sarrus linkage into the rib elements 14 may be used to select specific properties desirable in certain directions relative to the lattice structure 10. For example, if tension and compression are desirable but torsion is undesirable in a given application, the Sarrus linkages may be selectively oriented within the lattice structure 10 such that the lattice structure 10 is compliant in tension and compression but resistant in torsion. Here, the Sarrus linkage may provide an additional degree of freedom for the rib element 14 such that the rib element 14 can be freely deflected (or deflected with minimal resistance) along a longitudinal axis of the rib element 14.

In some embodiments, it may be desirable to arrange the unit cell 12 such that the hinge portions 16 are disposed in specific locations to absorb energy and vibrations at a specific frequency or within a specific frequency range. Accordingly, the lattice structure 10 may be configured to absorb vibrations from a specific frequency while other vibrations and energy sources may still be transmitted through the lattice structure 10. As such, in some embodiments, the lattice structure 10 may be used in vibration and energy sensing applications to filter vibrations within a certain frequency range out of a resulting measured value.

In some embodiments, the hinge portion 16 is a solid hinge portion such that the hinge is composed of a single part. Accordingly, the hinge portion 16 may be distinct from typical hinge portions that comprise multiple parts moving independently from one another. For example, a typical hinge may comprise a planar member having cylindrical hollow portion on one side thereof, said cylindrical portion having a pin received therein such that the cylindrical member rotates about the pin. However, embodiments of the present invention contemplate a solid unitary hinge portion which may be additively manufactured into rib elements 14 as a single part. Accordingly, the hinge portions 16 may not comprise a typical cylindrical portion rotating about a pin. Instead, in some embodiments, the hinged portion 16 is a unitary hinge portion configured to bend under certain loadings to absorb energy. In some embodiments, it may be desirable to decrease at least one dimension, such as a thickness, of the rib element 14 at the hinge portion 16 to facilitate bending at the hinge portion 16. Further, embodiments are contemplated where a surface area of the rib element 14 is increased at the vertex 17 of the hinge portion 16 to prevent damage thereto. For example, the increased surface area may prevent breaking or cracking of the rib element 14 at the hinge portion 16.

In some embodiments, the rib elements 14 of the unit cell 12 are arranged in an octahedral shape, as shown in FIG. 2. In some embodiments, other unit cell shapes and configurations are contemplated, such as, an octet truss unit cell, a cubic unit cell, a tetrahedron unit cell, and other polyhedron shapes, as well as a variety of other prismatic shapes. In some embodiments, the properties of the lattice structure 10 may be based on the shape of the unit cells 12. For example, the octahedral shape of the unit cell 12 may cause the lattice structure 10 to become compliant in tension and compression but resistant in torsion. Accordingly, unit cells 12 with varying shapes may have varying effects on the directional properties of the overall lattice structure 10.

In some embodiments, the shape and configuration of the unit cell 12 may be selected based on a property associated with the unit cell shape. For example, in some embodiments, it may be desirable to use an octet-truss unit cell because the octet-truss unit cell has a stretch-dominated deformation mechanism. Accordingly, the octet-truss unit cell shape is naturally more compliant in extension and compression as compared to bending. Alternatively, in some embodiments, it may be desirable to use a unit cell shape which has a bend-dominated deformation mechanism such that the unit cell 12 is naturally more compliant in bending compared to extension and compression.

In some embodiments, the hinge portion 16 is configured to damp acceleration and vibration within the lattice structure 10. For example, vibrations may be absorbed when the hinge portions 16 are folded. Accordingly, embodiments are contemplated where the hinge portions 16 convert energy into linear motion along the longitudinal axis of the respective rib element 14.

Embodiments are contemplated where only a select portion of the rib elements 14 comprises the hinge portion 16. Accordingly, unit cells 12 are contemplated where the directional properties are selectively adjusted based on the location of the hinge portions 16 within the unit cell 12. For example, in one embodiment, only rib elements 14 facing in a certain direction include hinge portions 16. Accordingly, the unit cell will be compliant in said certain direction but may resist deflection in all other directions.

Turning now to FIG. 3A, a first embodiment of a rib element 14 is shown having at least one hollow section 22. Hollow rib element 20 is depicted relating to some embodiments. The hollow rib element 20 comprises one or more hinge portions 16, as shown, and further comprises struts 19 having a hollow section 22. In some embodiments, the hollow section 22 extends through a length of the struts 19 of hollow rib element 20. In some embodiments, it may be desirable to include the hollow rib element 20 with the hollow section 22 to reduce the weight of the rib element which reduces the overall weight of the lattice structure 10 without significantly affecting the strength of the lattice structure 10. Further, in some embodiments, it may be desirable to include the hollow section 22 to increase a rigidity of the rib element.

In some embodiments, the dimensions of the hollow rib element 20 may be as follows. In some embodiments, a width, W, of the strut 19 of hollow rib element 20 may be about 1.0 mm to about 2.0 mm. In some embodiments, a width of the strut 19 of hollow rib element 20 may be about 1.5 mm. In some embodiments, a length, L, of the strut 19 of hollow rib element 20 on each side of the hinge portion 16 may be about 2.5 mm to about 3.5 mm. In some embodiments, a length of the strut 19 may be about 2.9 mm. In some embodiments, a resting angle of the hinge portion 16 may be about 90 degrees. In some embodiments, a resting angle may be between about 75 degrees to about 105 degrees. In some embodiments, a corrugation length, Lc, of each of the first side 13 and the second side 15 of the hinge portion 16 may be about 2 mm to about 3 mm. In some embodiments, a corrugation length, Lc may be about 2.5 mm. In some embodiments, a total resting rib length, Lr, of the hollow rib element 20 may be between about 9 mm and about 10 mm. In some embodiments, the total resting rib length may be about 9.33 mm. In some embodiments, the strut 19 may have a central passageway such that a rib wall thickness, T, may be about 0.2 mm to about 0.3 mm. In some embodiments, the rib wall thickness may be about 0.25 mm. However, it should be understood that a variety of different dimensions for the hollow rib element 20 are also contemplated.

Turning now to FIG. 3B, a second embodiment of a rib element 14 is shown having at least one solid section 26. Solid rib element 24 is depicted relating to some embodiments. The solid rib element 24 comprises one or more hinge portions 16, as shown, and further comprises struts 19 having a solid section 26. In some embodiments, the solid section 26 increases the strength and weight of the solid rib element 24. Further, in some embodiments, the solid rib element 24 may be easier to print using a low precision 3D printing technique.

In some embodiments, the dimensions of the solid rib element 24 may be as follows. In some embodiments, a width, W, of the strut 19 of solid rib element 24 may be about 0.2 mm to about 0.8 mm. In some embodiments, a width of the strut 19 of solid rib element 24 may be about 0.5 mm. In some embodiments, a length, L, of strut 19 on each side of the hinge portion 16 of the solid rib element 24 may be about 1.0 mm to about 1.8 mm. In some embodiments, a length of strut 19 may be about 1.39 mm. In some embodiments, a resting angle of hinge portion 16 may be between about 75 to about 105 degrees. In some embodiments, a resting angle of the hinge portion 16 may be about 90 degrees. In some embodiments, a corrugation length, Lc, of each of the first side 13 and the second side 15 of the hinge portion 16 may be about 1.8 mm to about 2.4 mm. In some embodiments, a corrugation length may be about 2.2 mm. In some embodiments, a total resting rib length of the solid rib element 24 may be about 5.5 mm to about 6.5 mm. In some embodiments, a total resting rib length may be about 6.1 mm. However, it should be understood that a variety of different dimensions for the solid rib element 24 are also contemplated.

In some embodiments, the dimensions of either of the hollow rib element 20 or the solid rib element 24 may be varied according to the specific material and manufacturing process used to produce the lattice structure 10. For example, in some embodiments, the dimensions of the rib elements 14 may be selected based on a precision of a 3D printer used to manufacture the lattice structure 10. In some embodiments, the dimensions may be further selected based upon the specific application of the lattice structure 10.

In some embodiments, rib elements 14 of unit cell 12 may either the hollow rib element 20 or the solid rib element 24. Further, embodiments are contemplated where each unit cell 12 comprises any combination of hollow rib elements 20 and solid rib elements 24. For example, a first portion of the rib elements 14 may be hollow rib elements 20 and a second portion of the rib elements 14 may be solid rib elements 24. Further, embodiments are contemplated where all rib elements 14 are hollow rib elements 20 or where all rib elements 14 are solid rib elements 24. Further, in some embodiments, the rib elements 14 may also be either hollow or solid.

Turning now to FIGS. 4A-C, exemplary diagrams show the various positions of the rib element 14 relating to some embodiments. Specifically, FIG. 4A shows the rib element 14 in a first position 32, FIG. 4B shows the rib element 14 in a second position 34, and FIG. 4C shows the rib element 14 in a third position 36.

As seen in FIG. 4A, in the first position 32, the rib element 14 is in a neutral or resting position where no load is being applied to the rib element 14. In some embodiments, the rib element 14 may be initially positioned in the neutral position when the rib element 14 is manufactured. The rib element 14 shown only comprises two hinge portions 16 for the sake of simplicity. However, embodiments are contemplated where each rib element 14 comprises any number of hinge portions 16. In some embodiments, it may be desirable to include four hinge portions 16 to increase the structural integrity.

As seen in FIG. 4B, in the second position 34, the rib element 14 is in a compressed or folded position. In some embodiments, the second position 34 is associated with a compressive loading of the rib element 14. For example, a compressive force may be applied at each end of the struts 19 of rib element 14, as shown. In some embodiments, the compressive loading causes the hinge portions 16 of the rib element 14 to fold outwards from the rib element 14 such that the overall length of the rib element 14 is reduced relative to the first position 32.

As seen in FIG. 4C, in the third position 36, the rib element 14 is in a tensioned or stretched position. In some embodiments, the third position 36 may be associated with a tensile loading of the rib element 14. For example, a tensile force may be applied at each end of the struts 19 of the rib element 14, as shown. In some embodiments, the tensile loading causes the hinge portions 16 of the rib element 14 to fold inwards into the rib element 14 such that the overall length of the rib element 14 is increased relative to the first position 32.

In some embodiments, deflecting the hinge portions 16 of the rib element 14, as shown, absorbs energy within the lattice structure 10 by converting the energy into movement along the longitudinal axis of the rib element 14. Accordingly, the deflection of the hinge portion 16 changes the overall length of the rib element 14. In some embodiments, it may be desirable to include the hinge portion 16 on at least a portion of the rib elements 14 to absorb energy and damp vibration through movement of the hinge portion 16. Accordingly, because the hinge portion 16 allows the length of the rib element 14 to change, the amplitude of vibrations transferred through the rib element 14 may be changed or reduced. Further, in some embodiments, the change in the vibration may be dependent on the specific structure. For example, in some embodiments, a peak amplitude of acceleration in at least one direction may be reduced.

Turning now to FIG. 5, an embodiment of a unit cell 12 having a cubic form is depicted relating to some embodiments. In some embodiments, the cubic unit cell 40 is repeated to form a lattice structure comprising a plurality of cubic unit cells 40. The cubic unit cell 40 comprises a plurality of rib elements 14. In some embodiments, only a portion of the rib elements 14 comprise hinge portions 16. For example, in some embodiments, hinge portion 16 is only included on rib elements 14 that are oriented along a specific horizontal axis of the cubic unit cell 40, as shown. Accordingly, the cubic unit cell 40 may be compliant to deflection along the specific horizontal axis but resistant to deflection and rigid in other directions.

In some embodiments, the cubic unit cell 40 may be a repeated unit cell of the lattice structure 10. Accordingly, the cubic unit cell 40 may be joined to a plurality of other cubic unit cells 40 at each corner of the cubic unit cell 40. In some embodiments, the cubic unit cell 40 may further comprise nodes 18 at each corner which are secured to a node of one or more other cubic unit cells 40 to form the lattice structure 10.

In some embodiments, it may be desirable to include a lattice structure comprising unit cells compliant to deflection along a certain axis. Accordingly, the hinge portions 16 may be included on rib elements 14 which are oriented in said certain axis so that the lattice structure is compliant to deflection along said certain axis. For example, if it is desired that a structure should rigidly support a load in a vertical direction but be freely deflected in a horizontal direction then the hinge portions 16 may be included on rib elements oriented in the horizontal direction. Additionally, embodiments are contemplated where the hinge portions 16 may be disposed on the rib elements 14 oriented in the vertical direction such that the lattice structure is compliant in vertical deflection.

Further, embodiments are contemplated where any unit cell shape may be selected to optimize deflection in a certain direction. In some embodiments, the placement of the hinge portions 16 may be varied according to the specific geometry of the unit cell and the desired directional properties. For example, a first portion of rib elements 14 oriented in a certain direction may include hinge portions 16 while a second portion of rib elements 14 may not include hinge portions 16. In some embodiments, the lattice structure 10 including the hinge portions 16 reduces a peak amplitude of acceleration in at least one direction when compared to a similar lattice structure without the hinge portions 16. For example, in some embodiments, the hinge portions 16 may be disposed along at least a portion of the rib elements 14 such that the peak amplitude in the X and Y directions is reduced while the peak amplitude in the Z direction may be increased or unchanged. Accordingly, embodiments are contemplated where the lattice structure 10 is compliant in a first axial direction and a second axial direction but resistant in a third axial direction.

In some embodiments, the lattice structure 10 may be used within an energy absorbing system in shock protection and vibration damping applications, for example, to protect sensitive components from shock, mitigate undesirable vibrations, and limit deflection or acceleration in a specific direction. In one example, the lattice structure 10 may be employed as a protective barrier for a sensitive component. Accordingly, the lattice structure 10 may be disposed around the sensitive component or at least a portion of the lattice structure 10 may be secured to the sensitive component to protect the sensitive component from external vibrations and shock. In some embodiments, the lattice structure 10 may be configured to support the sensitive component and in some embodiments, may surround the sensitive component to protect from shock. In some embodiments, the lattice structure 10 may be configured to absorb a large range of energy frequencies. Further, in some embodiments, the lattice structure 10 may be used to provide energy absorption in a specific direction. For example, in some embodiments, the lattice structure 10 may be configured, by placement of the hinge portions 16, to absorb vibration along a horizontal axis. Accordingly, in some embodiments, vibrations along other axes may not be absorbed.

In some embodiments, the lattice structure 10 may be formed as a planar or curved surface to be used in cushions, such as for a seat or backrest. In some embodiments, the lattice structure 10 may be formed as a planar surface to be used in footwear to provide energy absorption. In some embodiments, the lattice structure 10 may form a material to be worn, such as clothing. In some embodiments, the lattice structure 10 may form a partial or entire enclosure to absorb energy, such as for receiving an explosive charge. In some embodiments, the lattice structure 10 may be used in building materials, such as to form a building or a bridge structure.

In some embodiments, the lattice structure 10 may be used to provide structural support without significantly increasing weight. Additionally, in some embodiments, the lattice structure 10 may be employed to provide a porous structure that allows fluid flow to occur within the lattice structure 10. In some embodiments, the lattice structure 10 additionally provides anisotropic structural support along with any other function described herein. For example, the lattice structure 10 may allow fluid flow between gaps within the unit cell 12 while providing support in a first direction and compliancy in a second direction. Accordingly, the lattice structure 10 may be used to produce various components and structural parts where anisotropic properties are desired. In some embodiments, the lattice structure 10 may be employed in medical applications to simulate the flexibility and porousness of bone or another organic material. For example, the lattice structure 10 may be used to create an implant or bone replacement.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A unit cell for vibration damping within a three-dimensional lattice structure, the unit cell comprising:
- a plurality of rib elements, at least one rib element of the plurality of rib elements comprising:
  - three or more bendable solid hinge portions oriented along at least two distinct planes of the respective rib element,
  - wherein the three or more bendable solid hinge portions form a Sarrus linkage within the respective rib element,
  - wherein each of the three or more bendable solid hinge portions is configured to absorb energy by converting the energy into linear motion along a longitudinal axis of the respective rib element to thereby damp vibration within the three-dimensional lattice structure, and
  - wherein a first rib element of the plurality of rib elements is oriented in a first direction, and a second rib element of the plurality of rib elements is oriented in a second direction distinct from the first direction such that energy is absorbed by the three-dimensional lattice structure in both the first direction and the second direction.

2. The unit cell of claim 1, wherein at least a portion of the three-dimensional lattice structure is structurally coupled to a sensitive component to provide shock protection to the sensitive component.

3. The unit cell of claim 1, wherein the three or more bendable solid hinge portions are disposed at a center of a length of the respective rib element.

4. The unit cell of claim 1, wherein the three or more bendable solid hinge portions are disposed at an end of the respective rib element.

5. The unit cell of claim 1, wherein a surface area of the respective rib element is increased at a vertex of the three or more bendable solid hinge portions relative to another portion of the respective rib element.

6. The unit cell of claim 1, wherein the respective rib element is configured to be compressed such that the three or more bendable solid hinge portions fold outward away from the longitudinal axis of the respective rib element responsive to a compressive loading.

7. The unit cell of claim 6, wherein the respective rib element is configured to be stretched such that the three or more bendable solid hinge portions fold inward toward the longitudinal axis of the respective rib element responsive to a tensile loading.

8. A three-dimensional lattice structure for vibration damping, the three-dimensional lattice structure comprising a plurality of unit cells, each unit cell of the plurality of unit cells comprising:

a plurality of rib elements, at least one rib element of the plurality of rib elements comprising:

at least one Sarrus linkage having three or more bendable solid hinge portions that are additively manufactured and oriented along at least two distinct planes of the respective rib element, wherein the at least one Sarrus linkage is configured to absorb energy by converting the energy into linear motion along a longitudinal axis of the respective rib element to thereby damp vibration within the three-dimensional lattice structure, and wherein a first rib element of the plurality of rib elements is oriented in a first direction, and a second rib element of the plurality of rib elements is oriented in a second direction distinct from the first direction such that energy is absorbed by the three-dimensional lattice structure in both the first direction and the second direction.

9. The three-dimensional lattice structure of claim 8, wherein the three-dimensional lattice structure is additively manufactured via a 3D printing technique.

10. The three-dimensional lattice structure of claim 8, wherein at least a portion of the three-dimensional lattice structure is structurally coupled to a sensitive component to provide shock protection to the sensitive component.

11. The three-dimensional lattice structure of claim 8, wherein at least one rib element of the plurality of rib elements comprises a hollow section configured to reduce a weight of the three-dimensional lattice structure.

12. The three-dimensional lattice structure of claim 8, further comprising one or more non-bendable rib elements.

13. The three-dimensional lattice structure of claim 8, wherein at least a portion of the three-dimensional lattice structure is configured to surround a sensitive component to protect the sensitive component from shock.

14. The three-dimensional lattice structure of claim 8, wherein the three-dimensional lattice structure comprises a stretch-dominated lattice structure.

15. A system for vibration damping, the system comprising:

a three-dimensional lattice structure that is additively manufactured comprising a plurality of identical unit cells, each identical unit cell comprising:

a plurality of rib elements, wherein each rib element of a first portion of the plurality of rib elements comprises:

three or more bendable solid hinge portions that are additively manufactured and configured to absorb energy within the three-dimensional lattice structure by converting the energy into linear motion along a longitudinal axis of the respective rib element to thereby damp vibration within the three-dimensional lattice structure, wherein the three or more bendable solid hinge portions are oriented along at least two distinct planes of the respective rib element, wherein a first rib element of the plurality of rib elements is oriented in a first direction, and a second rib element of the plurality of rib elements is oriented in a second direction distinct from the first direction such that energy is absorbed by the three-dimensional lattice structure in both the first direction and the second direction, and wherein at least a portion of the three-dimensional lattice structure is structurally coupled to a sensitive component to provide shock protection to the sensitive component.

16. The system of claim 15, wherein each rib element of the first portion of the plurality of rib elements is compliant in a first axial direction and a second axial direction but resistant in a third axial direction.

17. The system of claim 15, wherein the three-dimensional lattice structure comprises a porous structure configured to allow fluid flow through the three-dimensional lattice structure.

18. The system of claim 15, wherein each rib element of a second portion of the plurality of rib elements comprises a non-bendable rib element, and wherein the first portion of the plurality of rib elements are selected based at least in part on a geometry of the plurality of identical unit cells and a desired deflection direction such that the three-dimensional lattice structure is compliant in the desired deflection direction.

19. The system of claim 15, wherein each rib element of the first portion of the plurality of rib elements is compliant in axial compression and tension but resistant in torsion.

* * * * *